United States Patent
Kimura

(10) Patent No.: US 7,908,617 B2
(45) Date of Patent: Mar. 15, 2011

(54) BROADCAST RECEIVING SYSTEM RESPONSIVE TO AMBIENT CONDITIONS

(75) Inventor: Sadahiro Kimura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1981 days.

(21) Appl. No.: 10/207,456

(22) Filed: Jul. 29, 2002

(65) Prior Publication Data

US 2003/0035550 A1 Feb. 20, 2003

(30) Foreign Application Priority Data

Jul. 30, 2001 (JP) ................................ 2001-229989

(51) Int. Cl.
H04N 7/16 (2006.01)
(52) U.S. Cl. .................. 725/10; 725/12; 725/14; 725/18
(58) Field of Classification Search .................... 725/10, 725/12, 14, 18
See application file for complete search history.

(56) References Cited

U.S. PATENT DOCUMENTS

| | | | | |
|---|---|---|---|---|
| 5,323,459 A * | 6/1994 | Hirano | | 379/391 |
| 5,592,148 A * | 1/1997 | Morales | | 340/540 |
| 6,768,517 B2 * | 7/2004 | Limberg et al. | | 348/614 |
| 6,798,754 B1 * | 9/2004 | Farhang-Boroujeny | | 370/286 |
| 6,889,382 B1 * | 5/2005 | Anderson | | 725/10 |
| 6,968,064 B1 * | 11/2005 | Ning | | 381/66 |
| 7,440,891 B1 * | 10/2008 | Shozakai et al. | | 704/233 |
| 2002/0025026 A1 * | 2/2002 | Gerszberg et al. | | 379/67.1 |
| 2002/0035404 A1 * | 3/2002 | Ficco et al. | | 700/65 |
| 2002/0104094 A1 * | 8/2002 | Alexander et al. | | 725/105 |
| 2003/0174847 A1 * | 9/2003 | Lane et al. | | 381/66 |

FOREIGN PATENT DOCUMENTS

| | | |
|---|---|---|
| JP | 734503 | 2/1995 |
| JP | 11250525 | 9/1999 |
| JP | 2000175141 | 6/2000 |
| JP | 2000350142 | 12/2000 |

* cited by examiner

Primary Examiner — Christopher Kelley
Assistant Examiner — Franklin S Andramuno
(74) Attorney, Agent, or Firm — Cooper & Dunham LLP

(57) ABSTRACT

A broadcast receiving system incorporating an echo canceling means automatically initiates recording of the broadcast and also controls the sound volume by taking into account the viewer's movements and ambient conditions, by using echo canceling means of the type used in hand-free telephones. The broadcast receiving system includes a broadcast receiving unit for receiving a broadcast in the form of either digital or analog signals; an echo canceling unit; and a determining unit for monitoring the amount of residual echoes in the echo canceling unit, determining whether the amount of residual echoes has exceeded a predetermined value, and instructing a storage unit to store the broadcast if the amount of residual echoes is found to have exceeded the predetermined value.

18 Claims, 4 Drawing Sheets

BROADCAST RECEIVING SYSTEM RESPONSIVE TO AMBIENT CONDITIONS

FIELD

This patent specification relates generally to broadcast receiving systems, and more specifically to receiving systems that respond to ambient conditions to initiate recording or other actions.

DISCUSSION OF BACKGROUND

Recording of images which are presented in programs by broadcast system such as, for example, television is now widely used. Some example use timers, as in Japanese Utility Model Application No. 7-34503, others automatically initiate recording on preset user's demands, as in Japanese Laid-Open Patent Applications No. 11-250525 and 2000-175141, and yet others are controlled by way of communication lines or network systems, as in Japanese Laid-Open Patent Application No. 2000-350142. The broadcast can be by air or through other means, such as cable.

However, no teaching has been found for automatically recording images that are presented in programs by taking into account a viewer's (or user's) movements into consideration. For example, a viewer who receives a visitor while viewing a TV program, or temporarily leaves the viewing area, and wants to initiate recording over the relevant time interval, needs to manually switch the TV recording equipment to a 'record mode'.

BRIEF SUMMARY

In an aspect of this disclosure, there is provided a broadcast receiving system incorporating an echo canceling means. Utilizing hand-free telephone capabilities of the echo canceling means, this broadcast receiving system is provided with the capabilities of automatically recording sounds and images carried in programs, and also suitably controlling the level of sound volume control, taking a viewer's (or user's) movements and ambient conditions into consideration.

A broadcast receiving system in an exemplary embodiment herein includes at least a broadcast receiving unit for receiving a broadcast in the form of either digital or analogue signals, an echo canceling unit, and a determining unit for monitoring the amount of residual echoes in the echo canceling unit, determining whether the amount of residual echoes has exceeded a predetermined value, and instructing a storage unit to store sound and image contents of the broadcast, if the amount of residual echoes is found to have exceeded the predetermined value.

According to another aspect, the broadcast receiving system is characterized by further including an amplifier for changing the volume of sound output, in which the echo canceling unit is capable of changing an amplification ratio of the amplifier to increase the volume of sound output, if the echo canceller indicates there is an additional source of sound, such as a conversation in the TV viewing area.

This broadcast receiving system may additionally include a switch selectively operated by a viewer (or user) to change the amplification ratio of the amplifier, if the echo canceller has indicated that there is another source of sound, such as a conversation in the viewing area.

According to another aspect, the broadcast receiving system is characterized by further including an interphone (intercom), in which the determining unit is further capable of monitoring whether the interphone is pressed on, and instructing the storage unit to store sound and image contents of the broadcast, if the interphone is pressed on.

According to another aspect, the broadcast receiving system is characterized by further including an internal clock for providing the time of initiating recording steps of the broadcast contents, and a display portion for displaying the time of initiating the recording steps.

The present disclosure and features and advantages thereof will be more readily apparent from the following detailed description and appended claims when taken with drawings.

DESCRIPTION OF PREFERRED EMBODIMENTS

In the following description accompanied by several drawings, specific embodiments of the broadcast receiving system with hand-free telephone capabilities are detailed, which is particularly useful for automatically recording sounds and images presented in TV programs, for example.

It is understood, however, that the present disclosure is not limited to these embodiments. For example, the use of the system for controlling image and sound recording taking viewer's movements and ambient conditions into consideration disclosed herein, may also be adapted to any form of a recording system. Other embodiments will be apparent to those skilled in the art upon reading the following description.

In the present disclosure, an echo canceling unit, or echo canceller, which is generally provided for implementing hand free telephone capabilities, is utilized suitably for detecting user's movements. Such an echo canceller is known in the art and its details need not be described. It is characterized by a transfer function $H(z)$ that relates its input to its output.

Figure 1:
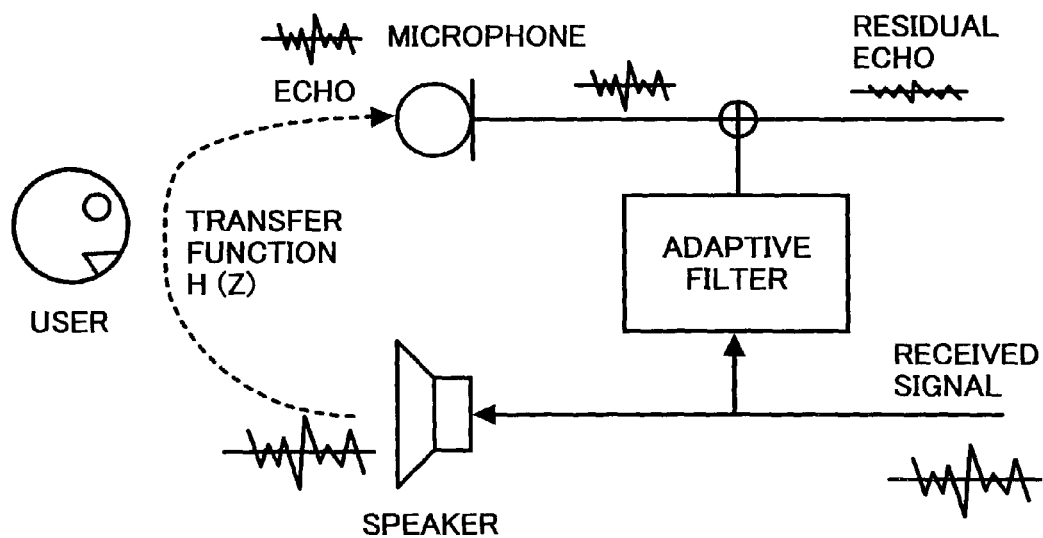
FIG. 1 is an exemplary schematic diagram illustrating a system where a residual echo is obtained with an echo canceller.

As long as the value of the transfer function, $H(z)$, remains the same, an adaptive filter in the echo canceller is operable to cancel detected noises, as in the circuit illustrated in FIG. 1. If the value of transfer function changes, however, the adaptive filter does not follow the change instantaneously. As a result, residual echoes are generated, which persist until the adaptive filter can catch up and follow the change properly.

One factor that can change the H(z) transfer function value is movement in the volume through which sound from the speaker reaches the microphone in a circuit such as in FIG. 1. Such movement includes movement by a person (user) in that volume. The detection of such movement is used in the system and method disclosed in this patent specification.

By suitably utilizing the abovementioned capabilities of the echo canceller, the present disclosure provides an improved broadcast receiving system. Namely, the broadcast receiving system disclosed herein is designed to keep the echo canceling capabilities turned on over while a user (i.e., viewer) is receiving the broadcast, and to automatically initiate process steps for recording the broadcast contents such as sounds (or voices) and images at the appropriate time. The latter process steps are initiated upon detecting that the viewer is moving or has moved out of the area adequate for viewing, e.g. TV viewing. An indication of this can be a determination that the amount of residual echoes exceeds a predetermined level of magnitude.

In addition, if the echo canceller has detected an additional source of sound, such as a conversation in the viewing/listening area (a state of "double-talk") using the hand-free telephone capabilities, the broadcast receiving system is also designed to automatically increase appropriately the sound volume of the broadcast being received, to account for the viewer being placed under noisy ambient conditions.

Figure 2:
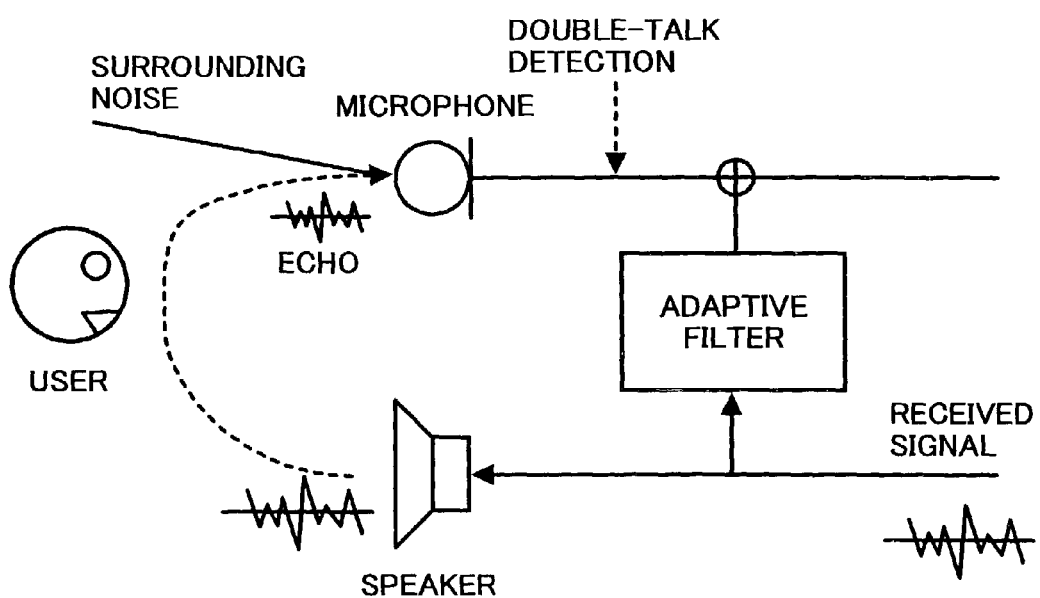
FIG. 2 is a schematic block diagram illustrating a broadcast receiving system according to one embodiment disclosed herein.

As illustrated in FIG. 2, if sounds other than the echoes (e.g., incoming noise from the ambient) are input into the adaptive filter through a microphone, a "double-talk" state may be detected without updating adaptive filter coefficients. In such a "double-talk" state, therefore, the present broadcast receiving system is capable of increasing the sound level from the speaker so the user can better hear the broadcast.

Additional features of the present broadcast receiving system will be described herein below in the section on preferred embodiments.

Figure 3:
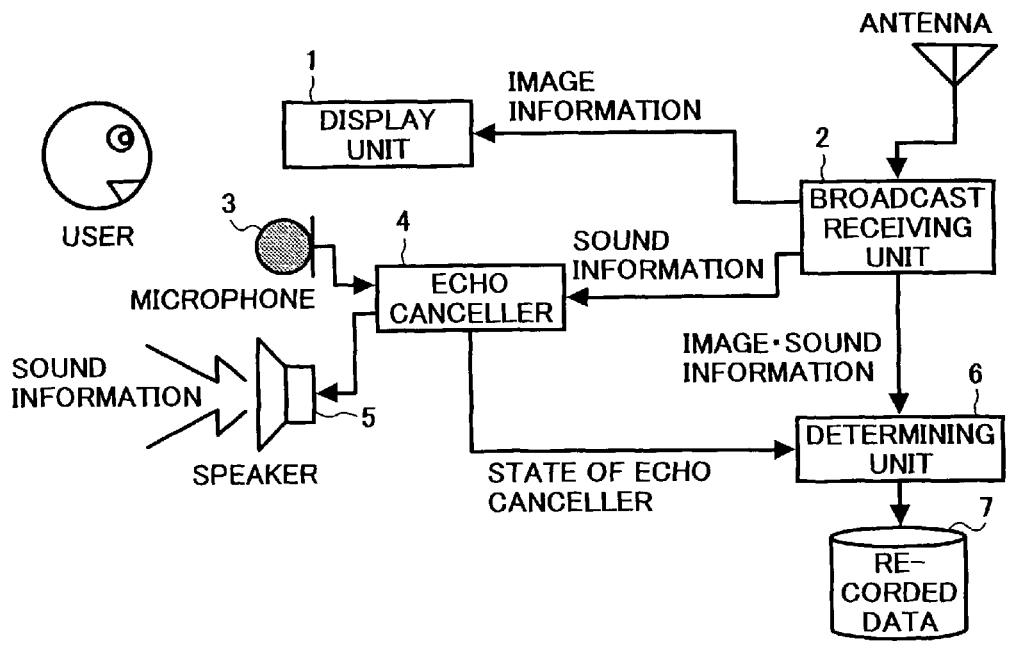
FIG. 3 is a schematic block diagram illustrating a broadcast receiving system according to another embodiment disclosed herein.

FIG. 3 is a schematic block diagram illustrating a broadcast receiving system according to one embodiment disclosed herein.

Referring to FIG. 3, the broadcast receiving system includes at least a display unit 1 for displaying to a viewer the contents of the broadcast, such as program material in the form of video or other image information, a broadcast receiving unit 2 for receiving the broadcast in the form of either digital or analogue signals, a microphone 3 for collecting echoes output from a speaker (and any other sounds from the ambient), an echo canceling unit 4 for implementing echo canceling, a speaker 5 for reproducing sound (e.g., speech and music) included in the broadcast programs as sound information that the viewer can listen to; a determining unit 6 for monitoring the state of the echo canceling unit 4, detecting whether the amount of residual echoes increases rapidly, and deciding whether process steps for recording the broadcast contents should be initiated; and a storage unit 7 for storing the data to be subjected to sound recording and/or image recording.

A hard disk is preferably used as a storage medium in the storage unit 7 rather than a cassette tape to ensure greater ease and reliability of the recording process and prevent recording failure due to failure to reload cassette tape.

The thus constructed broadcast receiving system operates as follows.

The signal contents of broadcast received with an antenna are processed (modulated or decoded) by the broadcast receiving unit 2, and then divided into image information and sound (e.g., voice) information for the former to be displayed on the display unit 1. After being input into the echo canceling unit 4, the sound information is used as reference information for computing adaptive filter coefficients, and subsequently output from the speaker 5.

Echoes output from the speaker 5 are collected with the microphone 3, sent to the echo canceling unit 4, and then subjected to an echo canceling process.

If a rapid increase in the amount of residual echoes is detected, information about the state of the echo canceling unit 4 (e.g., the power value of the residual echoes) is sent to the determining unit 6. If this echo power is found to have exceeded a predetermined value, the broadcast receiving system operates to decide that the viewer is moving or has moved out of the area adequate for broadcast reception, as described earlier, and to initiate process steps for recording the broadcast contents, such as sounds and images, in the storage unit 7.

Figure 4:
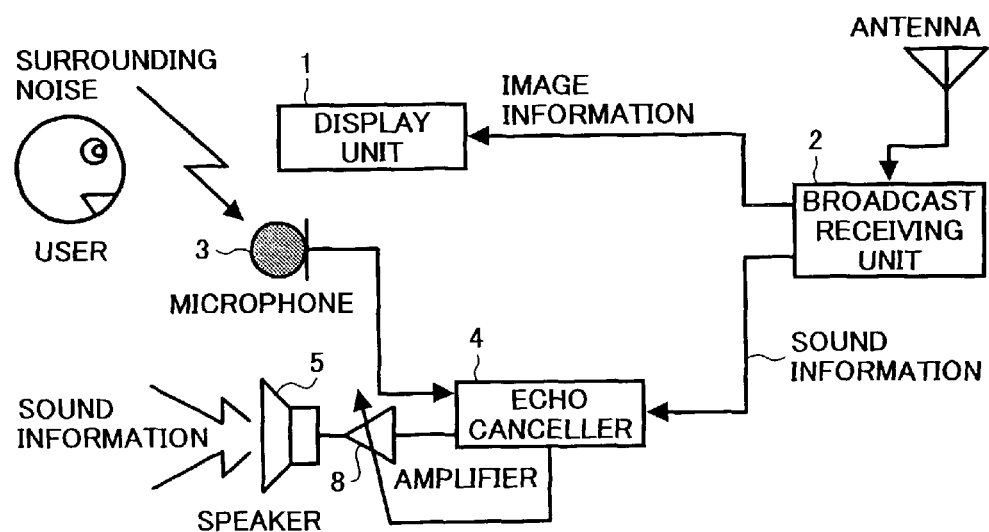
FIG. 4 is a schematic block diagram illustrating a broadcast receiving system further provided with an amplifier according to still another embodiment disclosed herein.

FIG. 4 is a schematic block diagram illustrating a broadcast receiving system according to another embodiment disclosed herein.

Referring to FIG. 4, the broadcast receiving system includes at least a display unit 1 for displaying to a viewer the contents of the broadcast including programs as image information, a broadcast receiving unit 2 for receiving the broadcast in the form of either digital or analogue signals, a microphone 3 for collecting echoes output from a speaker 5, an echo canceling unit 4 for implementing echo canceling, the speaker 5 for reproducing sound included in broadcast programs as sound information to the viewer; a determining unit 6 for monitoring the state of the echo canceling unit 4, and detecting whether the echo canceller is in the "double-talk" state; and an amplifier 8 for increasing the level of speaker output (or the volume of sound output), if the echo canceller has found that a "double-talk" state exists.

The broadcast receiving system according to the present embodiment operates as follows.

The signal contents of broadcast received with an antenna are processed (modulated or decoded) by the broadcast receiving unit 2, and then divided into image information and sound information for the former to be displayed on the display unit 1. After being input into the echo canceling unit 4, the sound information is used as reference information for computing adaptive filter coefficients, and subsequently output from the speaker 5.

Both echoes output from the speaker 5 and noises incoming from the ambient are collected with the microphone 3, and then sent to the echo canceling unit 4. If the echo canceller has found a "double-talk" state, the broadcast receiving system operates to determine that the viewer is in a noisy environment, and to adjust an amplification factor of the amplifier 8 to thereby increase the volume of sound output automatically.

Figure 5:
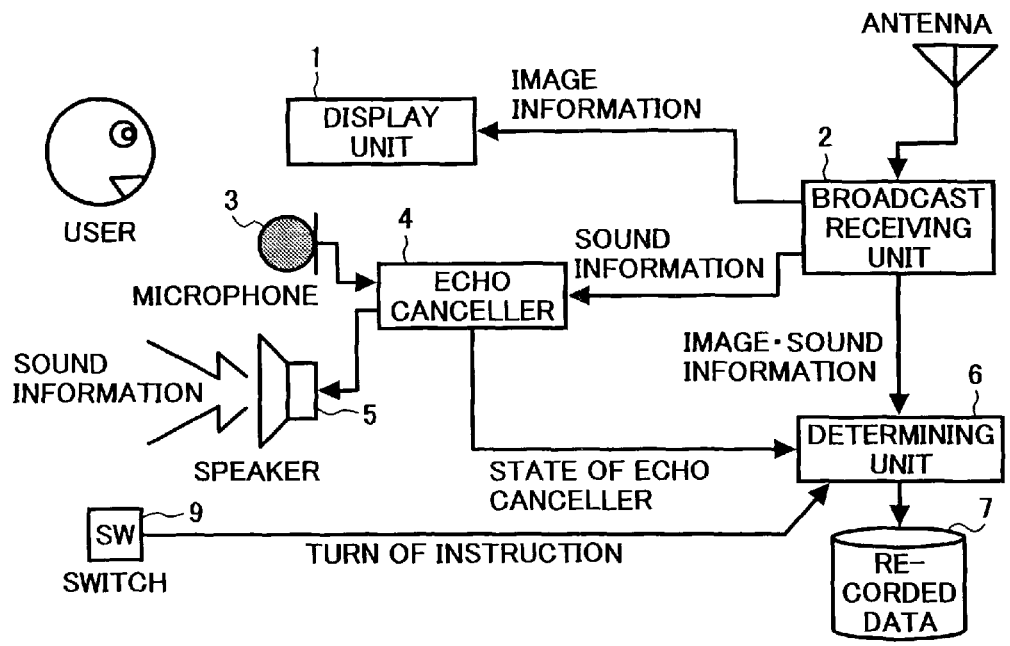
FIG. 5 is a schematic block diagram illustrating a broadcast receiving system further provided with a switch according to another embodiment disclosed herein.

FIG. 5 is a schematic block diagram illustrating a broadcast receiving system according to still another embodiment disclosed herein.

Referring to FIG. 5, the broadcast receiving system includes at least a display unit 1 for displaying to a viewer the contents of the broadcast including programs as image information, a broadcast receiving unit 2 for receiving the broadcast in the form of either digital or analogue signals, a microphone 3 for collecting echoes output from a speaker, an echo canceling unit 4 for implementing echo canceling, the speaker 5 for reproducing sound included in broadcast programs as voice (sound) information to the viewer; a determining unit 6 for monitoring the state of the echo canceling unit 4, detecting whether the amount of residual echoes increases rapidly, and determining whether process steps for recording the broadcast contents should be initiated; a storage unit 7 for storing the data to be subjected to either sound recording or image recording; and a switch 9 by which a viewer can selectively switch on or off the capability of sound and image recording provided in the broadcast receiving system.

The broadcast receiving system according to the present embodiment operates as follows.

The signal contents of broadcast received with an antenna are processed (modulated or decoded) by the broadcast receiving unit 2, and then divided into image information and sound information for the former to be displayed on the display unit 1. After being input into the echo canceling unit 4, the sound information is used as reference information for computing adaptive filter coefficients, and subsequently output from the speaker 5.

Echoes output from the speaker 5 are collected with the microphone 3, sent to the echo canceling unit 4, and then subjected to echo canceling process. If a rapid change in the amount of residual echoes is detected, the power value of the residual echoes is sent to the determining unit 6. If this echo power is found to have exceeded a predetermined value, the broadcast receiving system operates to check whether the switch 9 is turned on or off. If it finds that the switch 9 is turned on, the system operates to initiate process steps of recording sounds and images in the broadcast, to be stored in the storage unit 7, while no further instruction on the operation is issued if the switch 9 is turned off.

Figure 6:
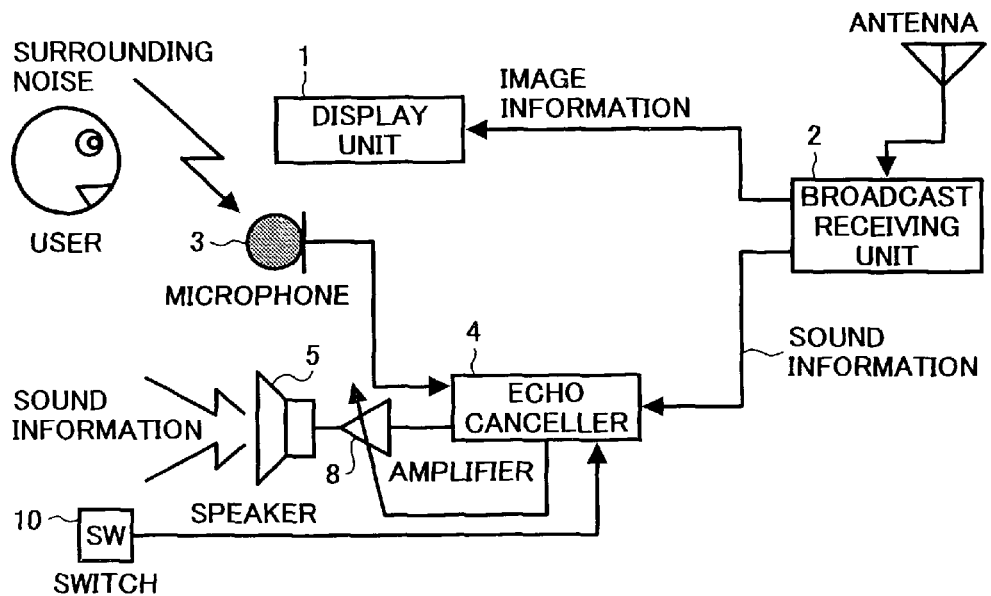
FIG. 6 is a schematic block diagram illustrating a broadcast receiving system further provided with an amplifier and a switch according to another embodiment disclosed herein.

FIG. 6 is a schematic block diagram illustrating a broadcast receiving system according to another embodiment disclosed herein.

Referring to FIG. 6, the broadcast receiving system includes at least a display unit 1 for displaying to a viewer the contents of the broadcast including programs as image information, a broadcast receiving unit 2 for receiving the broadcast in the form of either digital or analogue signals, a microphone 3 for collecting echoes output from a speaker, an echo canceling unit 4 for implementing echo canceling, the speaker 5 for reproducing sound included in broadcast programs as acoustic information to the viewer; a determining unit 6 for monitoring the state of the echo canceling unit 4, and detecting whether the echo canceller is in the "double-talk" state; an amplifier 8 for increasing the level of speaker output (or the volume of sound output), if the echo canceller has found a "double-talk" state; and a switch 10 for a viewer to be able to selectively switch on or off the capability of sound volume adjustment.

The broadcast receiving system according to the present embodiment operates as follows.

The signal contents of a broadcast received with an antenna are processed (modulated or decoded) by the broadcast receiving unit 2, and then divided into image information and sound information for the former to be displayed on the display unit 1. After being input into the echo canceling unit 4, the sound information is used as reference information for computing adaptive filter coefficients, and subsequently output from the speaker 5.

Both echoes output from the speaker 5 and noise or other sound from the ambient are collected with the microphone 3, and then sent to the echo canceling unit 4. If the echo canceller is found to be in the "double-talk" state, the broadcast receiving system operates to determine if the switch 9 on or off. If the switch 9 is on, the system operates to determine that the viewer is in a noisy environment, and to adjust an amplification factor of the amplifier 8, to thereby increase the volume of sound output automatically, while no further instruction on the operation is issued if the switch 9 is turned off.

Figure 7:
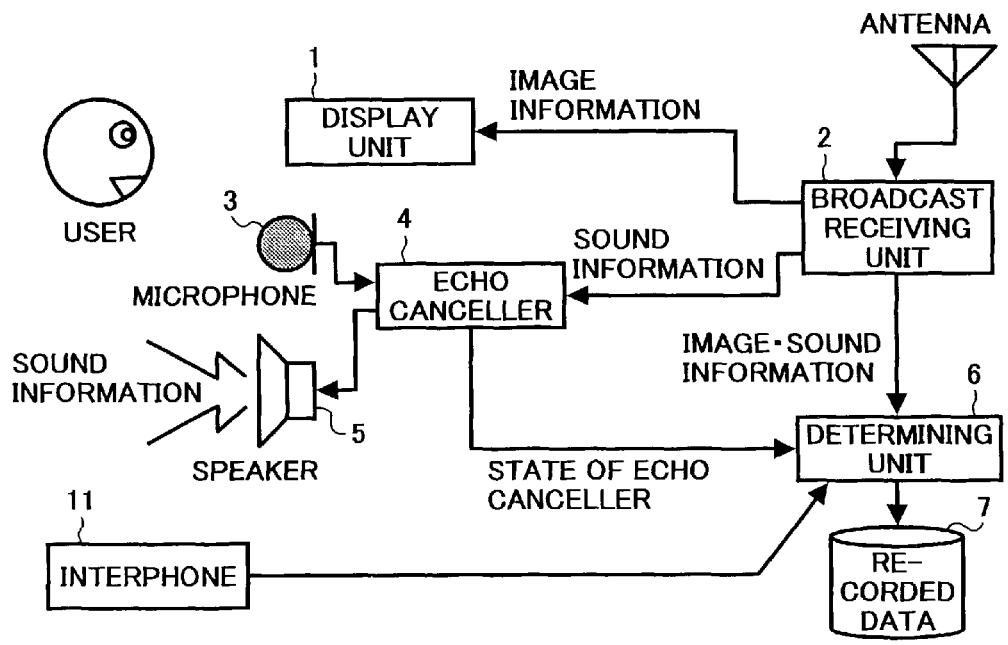
FIG. 7 is a schematic block diagram illustrating a broadcast receiving system further provided with an interphone according to another embodiment disclosed herein.

FIG. 7 is a schematic block diagram illustrating a broadcast receiving system according to another embodiment disclosed herein.

Referring to FIG. 7, the broadcast receiving system includes at least a display unit 1 for displaying to a viewer the contents of the broadcast including programs as image information, a broadcast receiving unit 2 for receiving the broadcast in the form of either digital or analogue signals, a microphone 3 for collecting echoes output from a speaker, an echo canceling unit 4 for implementing echo canceling, the speaker 5 for reproducing sound included in broadcast programs as sound information to the viewer; a determining unit 6 for monitoring the state of the echo canceling unit 4, detecting whether the amount of residual echoes increase rapidly, and determining whether process steps for recording the broadcast contents should be initiated; a storage unit 7 for storing the data to be subjected to sound recording and/or image recording; and an interphone (intercom) 11 installed at the viewer's premises.

The broadcast receiving system according to the present embodiment operates as follows.

The signal contents of broadcast received with an antenna are processed by the broadcast receiving unit 2, and then divided into image information and sound information for the former to be displayed on the display unit 1. After being input into the echo canceling unit 4, the sound information is used as reference information for computing adaptive filter coefficients, and subsequently output from the speaker 5.

Echoes output from the speaker 5 are collected with the microphone 3, sent to the echo canceling unit 4, and then subjected to an echo canceling process. If a rapid change in the amount of residual echoes is detected, the power value of the residual echoes is sent to the determining unit 6. If this echo power is found to have exceeded a predetermined value, the broadcast receiving system operates to initiate process steps for recording the broadcast contents such as sound and images, for the contents to be stored in the storage unit 7.

Furthermore, if the interphone 11 is pressed on, the determining unit 6 operates to recognize that there is a visitor that might require attention from the viewer, and to initiate process steps of recording the sounds and images in the broadcast, to be stored in the storage unit 7.

Figure 8:
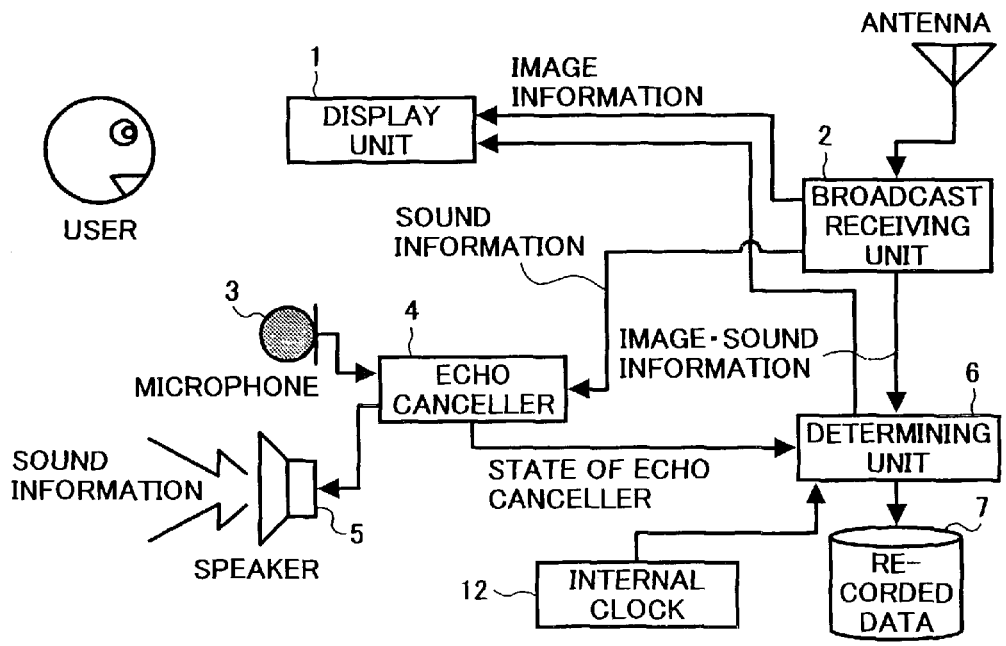
FIG. 8 is a schematic block diagram illustrating a broadcast receiving system further provided with an internal clock according to another embodiment disclosed herein.

FIG. 8 is a schematic block diagram illustrating a broadcast receiving system according to another embodiment disclosed herein.

Referring to FIG. 8, the broadcast receiving system includes at least a display unit 1 for displaying to a viewer the contents of the broadcast including programs as image information, a broadcast receiving unit 2 for receiving the broadcast in the form of either digital or analogue signals, a microphone 3 for collecting echoes output from a speaker, an echo canceling unit 4 for implementing echo canceling, the speaker 5 for regenerating sounds included in broadcast programs as sound information to the viewer; a determining unit 6 for monitoring the state of the echo canceling unit 4, detecting whether the amount of residual echoes increases rapidly, and deciding whether process steps for recording the broadcast contents should be initiated; a storage unit 7 for storing the data to be subjected to either sound and/or image recording; and an internal clock 12 for providing the time of initiating the steps of recording the broadcast contents.

The broadcast receiving system according to the present embodiment operates as follows.

The signal contents of broadcast received with an antenna are processed by the broadcast receiving unit 2, and then divided into image information and sound information for the former to be displayed on the display unit 1. After being input into the echo canceling unit 4, the sound information is used as reference information for computing adaptive filter coefficients, and subsequently output from the speaker 5.

Echoes output from the speaker 5 are collected with the microphone 3, sent to the echo canceling unit 4, and then subjected to an echo canceling process. If a rapid change in the amount of residual echoes is detected, the power value of the residual echoes is sent to the determining unit 6. If this echo power is found to have exceeded a predetermined value, the broadcast receiving system operates to initiate process steps for recording the broadcast contents such as sounds and images, for the contents to be stored in the storage unit 7.

Upon initiating the steps, the system also operates to send information for display at a screen of the display unit 1, to inform the viewer of the time the recording is initiated, together with a message indicating that an automatic recording of sounds and images has been initiated.

The systems and process steps set forth in the present description may therefore be implemented using a host computer and/or terminals disclosed herein incorporating appropriate processors programmed according to the teachings disclosed herein, as will be appreciated to those skilled in the relevant arts.

Therefore, the present disclosure also includes a computer-based product which may be hosted on a storage medium and includes instructions which can be used to program a processor to perform a process in accordance with the present disclosure. The storage medium can include, but is not limited to, any type of disk including floppy disks, optical disks, CD-ROMS, magneto-optical disks, ROMs, RAMs, EPROMs, EEPROMS, flash memory, magnetic or optical cards, or any type of media suitable for storing electronic instructions.

It is apparent from the above description including the examples, the broadcast receiving system disclosed herein offers several advantages such as, for example, automatically recording sound and images carried in programs, and also suitably controlling the level of sound output, taking viewer's movements and ambient conditions into consideration.

This is done in the disclosed examples by using the echo canceling unit and the determining unit capable of monitoring the amount of residual echoes in the echo canceling unit, deciding whether the amount of residual echoes has exceeded a predetermined value, and instructing the storage unit to store sound and image contents of the broadcast, if the amount of residual echoes is found to have exceeded the predetermined value.

Another advantage is the capability of increasing the level of sound output of the amplifier to facilitate hearing the program material under noisy conditions, implemented in the disclosed examples by suitably providing the echo canceller with the capability of detecting "double-talk" states and by suitably providing instruction from the determining unit.

An additional advantages is that by selectively operating a switch, the user can prevent recording or increase in amplification even in the presence of movement or ambient sound ("double-talk") or a state of an intercom that my otherwise initiate recording or an increase in amplification.

Still in addition, the disclosed examples make it possible for the viewer to review the time and contents recorded during the period of automatic recording, e.g., while the user was away from the viewing/listening area.

Additional modifications and variations of the present invention are possible in light of the above teachings. It is therefore to be understood that within the scope of the appended claims, the invention may be practiced other than as specifically described herein.

This document claims priority and contains subject matter related to Japanese Patent Application No. 2001-229989, filed with the Japanese Patent Office on Jul. 30, 2001, the entire contents of which are hereby incorporated by reference.

What is claimed is:

1. A broadcast receiving system, comprising:
   a broadcast receiving unit configured to receive a broadcast in digital or analogue form and reproduce sound contained in said broadcast to provide a sound output;
   an amplifier for changing a volume of said sound output;
   an echo canceling unit responsive to said sound output to provide information regarding residual echoes;
   a storage unit; and
   a determining unit configured to
      determine based on said information regarding said residual echoes whether a user is moving out of a broadcast viewing area, and
      automatically instruct said storage unit to record at least one of sound and image contents of said broadcast, if it is determined that the user is moving out of said broadcast viewing area,
   wherein said echo canceling unit is configured to change an amplification ratio of said amplifier to increase said volume of said sound output, if said echo canceling unit detects a double-talk state.

2. The broadcast receiving system according to claim 1, further comprising:
   a switch selectively operated to on and off states to thereby selectively enable and disable said storing of contents in said storage unit.

3. The broadcast receiving system according to claim 1, further comprising:
   a switch selectively operated to on and off states to thereby selectively enable and disable said changing of said amplification ratio.

4. The broadcast receiving system according to claim 1, further comprising:
   an interphone having on and off states;
   wherein said determining unit further includes a circuit for monitoring whether said interphone is in its on state, and instructing said storage unit to store said contents of said broadcast, if said interphone is on.

5. The broadcast receiving system according to claim 1, further comprising:
   an internal clock for providing a time related to initiating recording of said broadcast contents; and
   a display portion for displaying said time.

6. A broadcast receiving system, comprising:
   a broadcast receiving unit configured to receive a broadcast in digital or analogue form and reproduce sound contained in said broadcast to provide a sound output;
   an echo canceling unit responsive to said sound output to provide information regarding residual echoes;
   a storage unit;
   an amplifier configured to change a volume of said sound output; and
   a determining unit configured to
      determine based on said information regarding said residual echoes whether a user is moving out of a broadcast viewing area, and
      automatically cause the contents of said broadcast to be recorded in said storage unit, if it is determined that the user is moving out of said broadcast viewing area,
   wherein said echo canceling unit is configured to change an amplification ratio of said amplifier to increase said volume of said sound output, if said echo canceling unit detects a double-talk state.

7. The broadcast receiving system according to claim 6, further comprising:
a switch selectively operated to on and off states to selectively enable and disable said recording of contents in said storage unit.

8. The broadcast receiving system according to claim 6, further comprising:
a switch selectively operated to on and off states to selectively change said amplification ratio of said amplifier, if said echo canceling unit is in a double-talk state.

9. The broadcast receiving system according to claim 6, further comprising:
an interphone connected to said determining unit;
wherein said determining unit monitors whether said interphone is pressed on, and instructing said storage unit to record said contents of said broadcast, if said interphone is pressed on.

10. The broadcast receiving system means according to claim 6, further comprising:
an internal clock unit configured to provide information regarding a time of initiating recording of said broadcast contents; and
a display unit configured to display said time of initiating said recording steps.

11. A broadcast recording system comprising:
a broadcast receiver receiving information broadcast in digital or analogue form and reproducing sound contained in said broadcast to provide a sound output;
an amplifier for changing a volume of said sound output;
an echo canceling circuit responsive to said sound output to provide an output signal including information regarding residual echoes;
a data storing facility; and
a determining circuit configured to receive said output signal of said echo canceling circuit and determine whether a user is moving out of a broadcast viewing area, based on said output signal of said echo canceling circuit, and said determining circuit including a recording initiating circuit responsive to a determination that said user is moving out of said broadcast viewing area to automatically initiate recording of contents of said broadcast by said data storing facility,
wherein said echo canceling circuit is configured to change an amplification ratio of said amplifier to increase said volume of said sound output, if said echo canceling circuit detects a double-talk state.

12. A method of automatically initiating recording of contents of broadcasts, comprising:

(a) receiving a broadcast and reproducing sound therefrom as a sound output;
(b) providing an amplifier for changing a volume of said sound output;
(c) providing an echo canceller to monitor said sound output within a user area and output information regarding residual echoes;
(d) determining based on more selected parameters of said residual echoes in said information regarding said residual echoes whether a user is moving out of a broadcast viewing area;
(e) automatically initiating recording of contents of said broadcast if it is determined in (d) based on said one or more selected parameters of said residual echoes that the user is moving out of said broadcast viewing area; and
(f) changing an amplification ratio of said amplifier to increase said volume of said sound output, if a double-talk state is detected based on said information regarding said residual echoes.

13. A method as in claim 12 wherein said selected parameters of the residual echoes include changes in the residual echoes due to selected motion of a viewer of said broadcast at said user area.

14. A method as in claim 12 wherein said selected parameters of the residual echoes include changes in the residual echoes due to sound of selected characteristics at said viewer area that is in addition to said sound output.

15. A method as in claim 12 further including automatically increasing said sound output if said residual echoes meet selected criteria.

16. The broadcast receiving system according to claim 1, wherein said information regarding said residual echoes indicates an amount of said residual echoes, and said determining unit determines whether said amount of said residual echoes has exceeded a predetermined value, and instructs said storage unit to store said contents of said broadcast, if said determining unit determines that said amount of said residual echoes exceeded said predetermined value.

17. The broadcast receiving system according to claim 1, wherein the determining unit does not automatically instruct said storage unit to record at least one of sound and image contents of said broadcast, if it is determined that the user is not moving out of said broadcast viewing area.

18. The broadcast receiving system according to claim 1, wherein said broadcast viewing area is an area proximate to said broadcast receiving unit.

* * * * *